US011399382B2

United States Patent
Frederiksen et al.

(10) Patent No.: US 11,399,382 B2
(45) Date of Patent: Jul. 26, 2022

(54) ENABLING UPLINK TRANSMISSION DURING DOWNLINK SUBFRAME BASED ON PREEMPTION OF DATA TRANSMISSION IN WIRELESS NETWORK

(71) Applicant: Nokia Technologies Oy, Espoo (FI)

(72) Inventors: Frank Frederiksen, Klarup (DK); Klaus Pedersen, Aalborg (DK); Claudio Rosa, Randers NV (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 111 days.

(21) Appl. No.: 16/639,769

(22) PCT Filed: Sep. 11, 2018

(86) PCT No.: PCT/FI2018/050641
§ 371 (c)(1),
(2) Date: Feb. 18, 2020

(87) PCT Pub. No.: WO2019/058022
PCT Pub. Date: Mar. 28, 2019

(65) Prior Publication Data
US 2020/0205173 A1 Jun. 25, 2020

Related U.S. Application Data

(60) Provisional application No. 62/562,349, filed on Sep. 22, 2017.

(51) Int. Cl.
*H04W 72/12* (2009.01)
*H04L 1/18* (2006.01)
(Continued)

(52) U.S. Cl.
CPC ....... *H04W 72/1242* (2013.01); *H04L 1/1819* (2013.01); *H04L 1/1887* (2013.01);
(Continued)

(58) Field of Classification Search
CPC ......... H04W 72/1242; H04W 28/0278; H04W 72/042; H04L 1/1819; H04L 1/1887;
(Continued)

(56) References Cited

U.S. PATENT DOCUMENTS

2011/0261814 A1 10/2011 Matthews et al.
2017/0135084 A1* 5/2017 Kuchibhotla ......... H04W 24/08
(Continued)

FOREIGN PATENT DOCUMENTS

CN 1705295 A 12/2005
CN 106162891 A 11/2016
(Continued)

OTHER PUBLICATIONS

Fujitsu, On eMBB and URLLC multiplexing for uplink, 3GPP TSG RAN WG1 Meeting NR#3, Nagoya, Japan, Sep. 18-21, 2017, R1-1715491. (Year: 2017).*
(Continued)

*Primary Examiner* — Shailendra Kumar
(74) *Attorney, Agent, or Firm* — Squire Patton Boggs (US) LLP

(57) ABSTRACT

A technique includes receiving, by a user device from a base station in a wireless network, a downlink control information associated with a priority downlink data transmission from the base station that preempts an ongoing data transmission; determining, by the user device based on the downlink control information, a set of resources allocated for a priority uplink transmission, wherein the set of resources allocated for the priority uplink transmission were previously indicated by the base station as allocated for other use; and sending, by the user device, an uplink transmission via the set of resources allocated for priority uplink transmission.

18 Claims, 8 Drawing Sheets

(51) Int. Cl.
*H04L 5/00* (2006.01)
*H04L 47/24* (2022.01)
*H04W 28/02* (2009.01)
*H04W 72/04* (2009.01)

(52) U.S. Cl.
CPC .......... *H04L 5/0055* (2013.01); *H04L 5/0057* (2013.01); *H04L 47/245* (2013.01); *H04W 28/0278* (2013.01); *H04W 72/042* (2013.01)

(58) Field of Classification Search
CPC ... H04L 5/0055; H04L 5/0057; H04L 47/245; H04L 5/0044; H04L 5/0094; H04L 2001/0097; H04L 1/1854; H04L 1/1896; H04L 1/1671; H04L 5/005
See application file for complete search history.

(56) References Cited

U.S. PATENT DOCUMENTS

| | | | |
|---|---|---|---|
| 2017/0230939 A1 | 8/2017 | Rudolf et al. | |
| 2017/0230994 A1 | 8/2017 | You et al. | |
| 2018/0167938 A1* | 6/2018 | Stephenne | H04L 1/0068 |
| 2018/0332608 A1* | 11/2018 | Guo | H04W 76/28 |
| 2020/0008179 A1* | 1/2020 | Lee | H04L 5/1446 |

FOREIGN PATENT DOCUMENTS

| | | | | |
|---|---|---|---|---|
| CN | 107666684 A | | 2/2018 | |
| WO | 2017/056003 A2 | | 4/2017 | |
| WO | 2017/117424 A1 | | 7/2017 | |
| WO | WO-2017117424 A1 | * | 7/2017 | ........... H04L 5/0007 |
| WO | 2017/141082 A1 | | 8/2017 | |
| WO | WO 2018/126934 A1 | | 7/2018 | |

OTHER PUBLICATIONS

Qualcomm Incorporated, Use cases of multi-bit HARQ-ACK feedback, 3GPP TSG-RAN WG1 #88bis, Apr. 3-7, 2017, Spokane, USA, R1-1705619. (Year: 2017).*

Fraunhofer HHI, Early HARQ for URLLC, 3GPP TSG RAN WG1 Meeting NR#3, Nagoya, Japan, Sep. 18-21, 2017, R1-1716136. (Year: 2017).*

Pedersen et al., "Punctured Scheduling for Critical Low Latency Data on a Shared Channel with Mobile Broadband", IEEE 86th Vehicular Technology Conference (VTC—Fall), Sep. 24-27, 2017, 6 pages.

"3rd Generation Partnership Project; Technical Specification Group Radio Access Network; Study on New Radio Access Technology Physical Layer Aspects (Release 14)", 3GPP TR 38.802, V14.1.0, Jun. 2017, pp. 1-143.

"Physical uplink control channel procedures", 3GPP TS 36.213, V14.2.0, Mar. 2017, pp. 303-384.

International Search Report and Written Opinion received for corresponding Patent Cooperation Treaty Application No. PCT/FI2018/050641, dated Nov. 7, 2018, 17 pages.

"Pause-Resume Scheduling for Low Latency Uplink Transmissions", 3GPP TSG-RAN WG1 NR AH #3, R1-1715550, Agenda: 6.3.3.6, Nokia, Sep. 18-21, 2017, 4 pages.

Wang et al., "Performance Evaluation of Grant-free Transmission for Uplink URLLC Services", IEEE 85th Vehicular Technology Conference (VTC Spring), Jun. 4-7, 2017, 6 pages.

Extended European Search Report received for corresponding European Patent Application No. 18859607.6, dated May 19, 2021, 9 pages.

"On eMBB and URLLC multiplexing for uplink", 3GPP TSG RAN WG1 Meeting NR#3, Fujitsu, R1-1715491, Agenda Item: 6.3.3.6, Sep. 18-21, 2017, pp. 1-4.

"Use cases of multi-bit HARQ-ACK feedback", 3GPP TSG-RAN WG1 #88bis, Qualcomm Incorporated, R1-1705619, Agenda item: 8.1.3.3.1, Apr. 3-7, 2017, pp. 1-8.

"On indication for downlink punctured/preemptive scheduling", 3GPP TSG-RAN WG1#88, Nokia, R1-1703327, Agenda item: 8.1.3.4.1, Feb. 13-17, 2017, 4 pages.

Office action received for corresponding Indian Patent Application No. 202047007131, dated May 21, 2021, 9 pages of office action.

First Office Action dated Mar. 11, 2022 corresponding to Chinese Patent Application No. 201880060779.2, with English summary thereof.

* cited by examiner

ENABLING UPLINK TRANSMISSION DURING DOWNLINK SUBFRAME BASED ON PREEMPTION OF DATA TRANSMISSION IN WIRELESS NETWORK

RELATED APPLICATION

This application was originally filed as PCT Application No. PCT/FI2018/050641 on Sep. 11, 2018, which claims priority from U.S. Provisional Application No. 62/562,349, filed on Sep. 22, 2017.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

SUMMARY

According to an example implementation, a method includes receiving, by a user device from a base station in a wireless network, a downlink control information associated with a priority downlink data transmission from the base station that preempts an ongoing data transmission; determining, by the user device based on the downlink control information, a set of resources allocated for a priority uplink transmission, wherein the set of resources allocated for the priority uplink transmission were previously indicated by the base station as allocated for other use; and sending, by the user device, an uplink transmission via the set of resources allocated for priority uplink transmission.

According to an example implementation, an apparatus includes at least one processor and at least one memory including computer instructions, when executed by the at least one processor, cause the apparatus to: receive, by a user device from a base station in a wireless network, a downlink control information associated with a priority downlink data transmission from the base station that preempts an ongoing data transmission; determine, by the user device based on the downlink control information, a set of resources allocated for a priority uplink transmission, wherein the set of resources allocated for the priority uplink transmission were previously indicated by the base station as allocated for other use; and send, by the user device, an uplink transmission via the set of resources allocated for priority uplink transmission.

According to an example implementation, an apparatus includes means for receiving, by a user device from a base station in a wireless network, a downlink control information associated with a priority downlink data transmission from the base station that preempts an ongoing data transmission; means for determining, by the user device based on the downlink control information, a set of resources allocated for a priority uplink transmission, wherein the set of resources allocated for the priority uplink transmission were previously indicated by the base station as allocated for other use; and means for sending, by the user device, an uplink transmission via the set of resources allocated for priority uplink transmission.

According to an example implementation, a computer program product includes a computer-readable storage medium and storing executable code that, when executed by at least one data processing apparatus, is configured to cause the at least one data processing apparatus to perform a method including: receiving, by a user device from a base station in a wireless network, a downlink control information associated with a priority downlink data transmission from the base station that preempts an ongoing data transmission; determining, by the user device based on the downlink control information, a set of resources allocated for a priority uplink transmission, wherein the set of resources allocated for the priority uplink transmission were previously indicated by the base station as allocated for other use; and sending, by the user device, an uplink transmission via the set of resources allocated for priority uplink transmission.

According to an example implementation, a method includes preempting, by a base station in a wireless network, an ongoing data transmission associated with a second user device with a priority downlink transmission to a first user device based on a reallocation of a first set of resources for the priority downlink transmission to the first user device; and allocating, based on the preempting, a second set of resources for a priority uplink transmission, wherein the second set of resources were previously indicated by the base station as allocated for other use.

According to an example implementation, an apparatus includes at least one processor and at least one memory including computer instructions, when executed by the at least one processor, cause the apparatus to: preempt, by a base station in a wireless network, an ongoing data transmission associated with a second user device with a priority downlink transmission to a first user device based on a reallocation of a first set of resources for the priority downlink transmission to the first user device; and allocate, based on the preempting, a second set of resources for a priority uplink transmission, wherein the second set of resources were previously indicated by the base station as allocated for other use.

According to an example implementation, an apparatus includes means for preempting, by a base station in a wireless network, an ongoing data transmission associated with a second user device with a priority downlink transmission to a first user device based on a reallocation of a first set of resources for the priority downlink transmission to the first user device; and means for allocating, based on the preempting, a second set of resources for a priority uplink transmission, wherein the second set of resources were previously indicated by the base station as allocated for other use.

According to an example implementation, a computer program product includes a computer-readable storage medium and storing executable code that, when executed by at least one data processing apparatus, is configured to cause the at least one data processing apparatus to perform a method including: preempting, by a base station in a wireless network, an ongoing data transmission associated with a second user device with a priority downlink transmission to a first user device based on a reallocation of a first set of resources for the priority downlink transmission to the first user device; and allocating, based on the preempting, a second set of resources for a priority uplink transmission, wherein the second set of resources were previously indicated by the base station as allocated for other use.

The details of one or more examples of implementations are set forth in the accompanying drawings and the description below. Other features will be apparent from the description and drawings, and from the claims.

DETAILED DESCRIPTION

Figure 1:
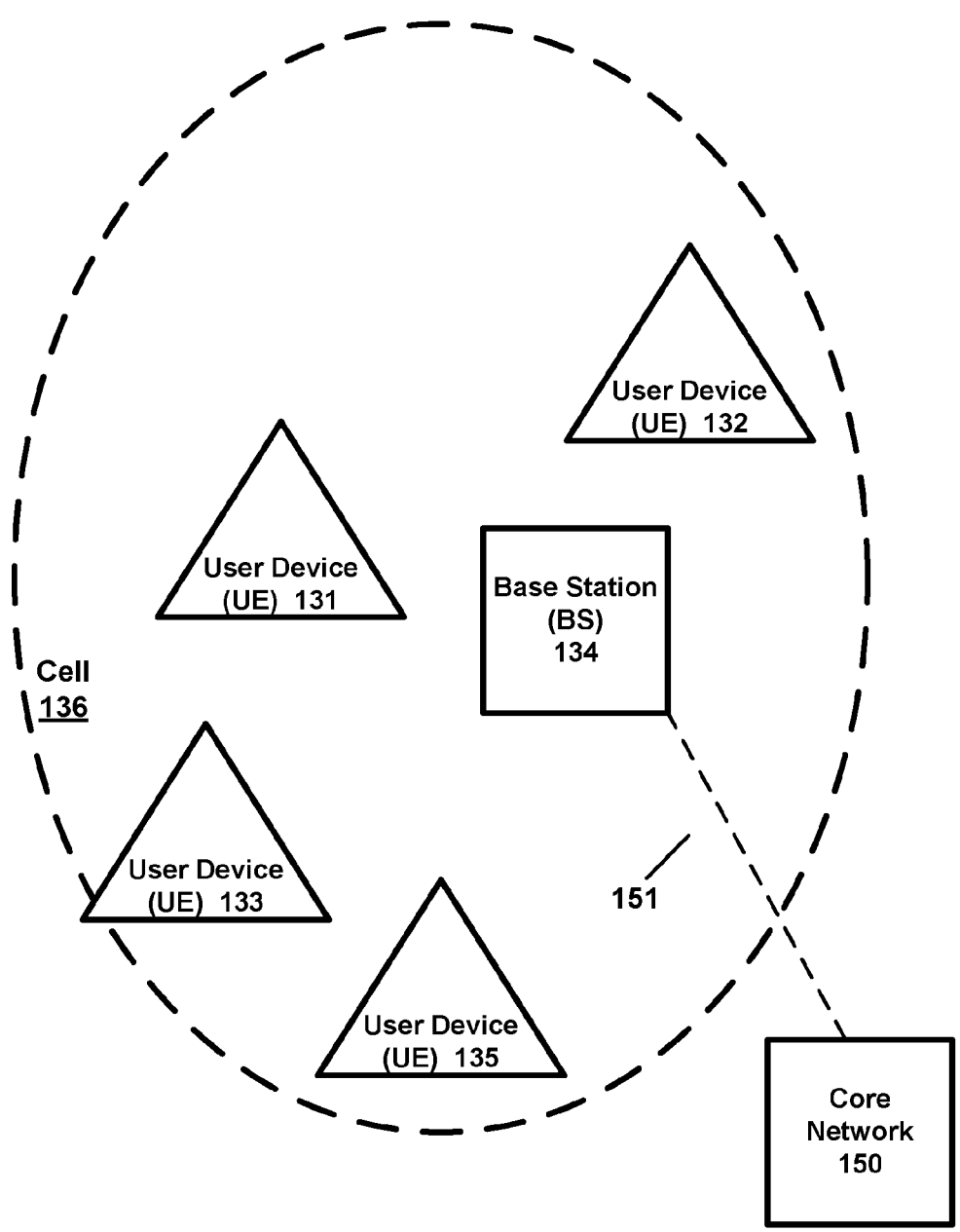
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability).

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

As noted, different data service types (or different types of UEs) may have different performance requirements, such as for reliability (e.g., maximum block error rate), bandwidth or data throughput or minimum data rate, and latency. Some data service types, such as eMBB, may require higher data rates, while tolerating higher block error rates and higher latency (as compared to URLLC). On the other hand, some high reliability data service types, such as URLLC or HRLLC, may require much higher reliability (e.g., lower block error rates) and lower latency, as compared to eMBB.

In an example implementation, some types of traffic (e.g., eMBB) may use, at least in some cases, a relatively long transmission time interval (TTI), such as a subframe or slot size, e.g., 7 or 14 OFDM (orthogonal frequency division multiplexing) symbols, so as to maximize or improve data rates. Whereas, other types of traffic that may require lower latency (e.g., URLLC or high reliability low latency communications (HRLLC)) may use a short (or shorter) TTI, such as smaller subframe or slot sizes (which may be known as mini-slot), e.g., 1-3 OFDM symbols, for the transmission of data, so as to reduce latency.

Similarly, according to an example implementation, some types of UEs or service types, which may not require low latency (e.g., eMBB applications/service types), may transmit uplink control information via a long physical uplink control channel (PUCCH) format length and a long TTI, e.g., using a slot size of 7 or 14 symbols. On the other hand, for example, a high reliability/low latency communications (e.g., URLLC or HRLLC) data service type (or URLLC application) on a UE may transmit uplink control information via a short physical uplink control channel (PUCCH) format length and a short TTI (e.g., to allow for quicker or more frequent transmission of control information) using a mini-slot of length 1-3 symbols, for example. Thus, in some cases, a longer PUCCH format using a (longer) slot (or long TTI) of 7 or 14 symbols (for example) may be used to allow more data/control information to be sent over a period of time (e.g., for eMBB data service type), while a shorter PUCCH format using a (shorter) mini-slot of 1-3 symbols may be used to allow for a quicker transmission of uplink control information in the case where a shorter latency (e.g., such as for transmission of HARQ feedback) may be required (such as for URLLC/HRLLC data service type). Although, in another example implementation, the eMBB or non high reliability data service types (such as eMBB and others) may also use a short PUCCH format length and mini-slot.

In an example implementation, uplink control information (UCI) may include, for example one or more of: a scheduling request (SR) that the UE may send to request uplink resources for transmission, a hybrid automatic repeat request (HARQ) feedback, e.g., HARQ Acknowledgement/ACK to acknowledge receipt of data, or HARQ negative acknowledgement/NAK to negatively acknowledge data (e.g., indicate that data was not received); and/or channel state information (CSI feedback, which may include, e.g., a rank indication (RI), a precoder matrix indication (PMI), and/or a channel quality indication (CQI)). Also, reference signals, such as sounding reference signal (SRS) and/or demodulation reference signals (DMRS), may be transmitted by a UE, and may be used by a BS to perform channel sounding and/or estimation and then decode received signals or data from the UE.

According to an example implementation, in New Radio (NR) (5G) frame structure design (by way of illustrative example), both slot and mini-slot may be supported. The duration of a slot may be, in an illustrative example, either 7 or 14 symbols depending on the subcarrier spacing of the used numerology. The possible durations of a mini-slot may at least include 1 or 2 OFDM symbols, by way of illustrative example.

Figure 2:
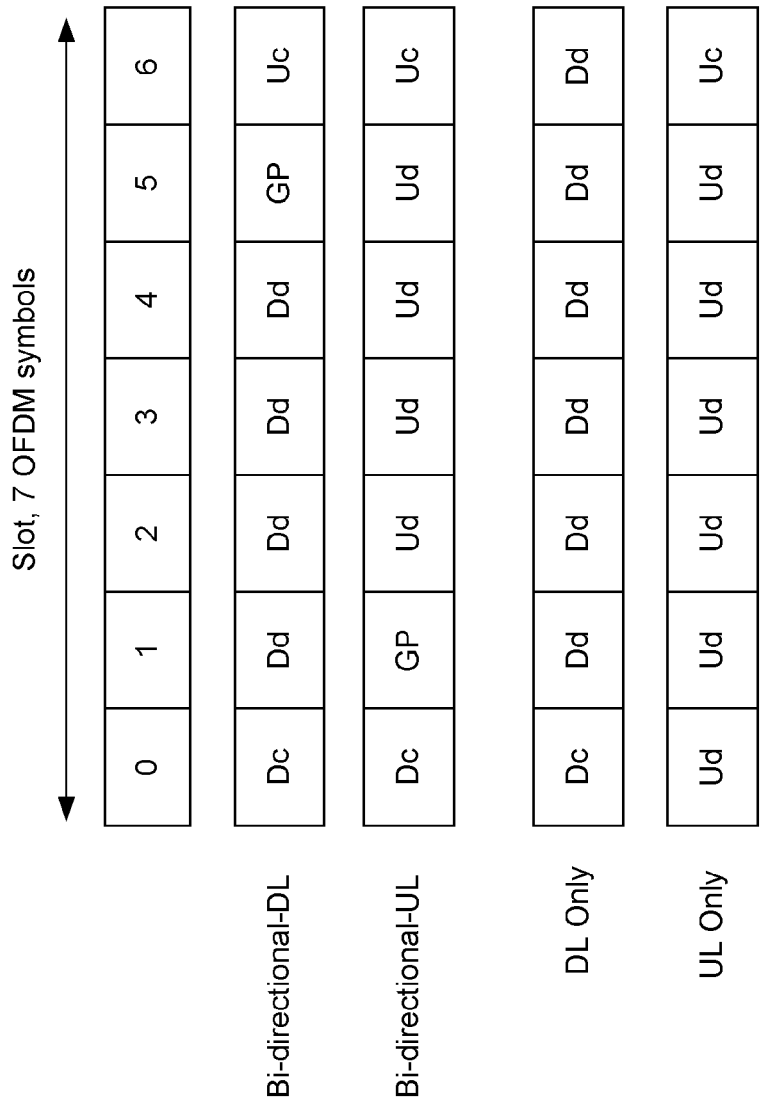
FIG. 2 is a diagram illustrating some slot types according to an example implementation.

FIG. 2 is a diagram illustrating some illustrative example slot types according to an example implementation. Symbols are shown for each slot type, with Dc referring to downlink control information, Dd referring to downlink data, GP referring to a guard period, Uc referring to uplink control information, and Ud referring to uplink data. For example, there may be several slot types, as shown in FIG. 2 (some examples shown in FIG. 2), that provide the basic support for both TDD (time division duplexing) and FDD (frequency division duplexing). For the bi-directional slots, there is either downlink data or uplink data transmission in each slot, as well as the corresponding downlink and uplink control. Bi-directional slot may facilitate many TDD functionalities in the NR (5G) frame structure, such as, e.g., link direction switching between DL and UL, fully flexible traffic adaptation between DL and UL, and opportunity for low latency, provided that slot length is selected to be short enough. Referring to FIG. 2, in an example implementation, in each (or one or more) of the slots, multiplexing between DL control, DL/UL data, GP and UL control may be based, for example, on time division multiplexing allowing fast energy efficient pipeline processing of control and data in the receiver. In addition to bi-directional slots, there are also DL-only slot and UL-only slot in FIG. 2. These slot types may be used at least in FDD mode, but also in certain TDD scenarios to allow longer transmission periods in same direction.

According to an example implementation, there can be multiple mini-slots in a slot, and different UEs can be scheduled in different mini-slots. Depending on the system operation point (e.g., offered traffic), the use of a mini-slot for lower air interface latency is useful not only for URLLC/HRLLC, but also for some eMBB applications (e.g. for quickly overcoming slow start TCP/transmission control protocol) procedures.

A mini-slot may be used, for example, to support URLLC or HRLLC—with strict delay requirements, which may require small scheduling granularity in time. If a packet is scheduled using a slot, e.g., for HARQ ACK feedback (FB), the delay (between transmission of data and HARQ FB for such data) may be 1 or 2 or 3 slots later, for example, which is a substantial delay that may not be tolerated by URLLC/HRLLC. For mini-slots, HARQ FB may be scheduled or transmitted much quicker, e.g., later in same slot that data was received, or in the next slot, which may better accommodate a strict delay requirements for URLLC, for example.

According to an example implementation, a BS may receive data (traffic) for one or more UEs that are connected to the BS/cell. A BS may multiplex data/traffic for transmission to the plurality of UEs, and may multiplex traffic/data of different types (e.g., having different QoS requirements, such as different maximum latencies). As an illustrative example, a BS may multiplex both LLC (low latency communications) (e.g., priority or high priority traffic) eMBB (or low priority or non-priority traffic) in a downlink shared channel.

A variety of factors may be considered by the BS (or other nodes) when determining whether data or traffic received for downlink transmission to a UE is priority (or high priority), as compared to other (e.g., low priority or non-priority) traffic. For example, a traffic type (e.g., URLLC/HRLLC, eMBB, or other traffic type), quality of service requirements (such as maximum latency), and other factors may be considered in determining whether the traffic/data is priority traffic or not. Also, prioritization of certain traffic/data may vary in time, e.g., based on the status of the data with respect to a maximum latency for the traffic. For example, if data is received by a BS that is within a threshold period of time of exceeding the maximum latency for such traffic type (e.g., data is nearing the maximum latency allowed for such traffic type), then that data/traffic may be elevated by the BS to a priority over other types of traffic, for example.

In a simple illustrative example, URLLC/HRLLC data received by a BS (e.g., having a relatively short maximum latency requirement) may be considered a priority data/traffic as compared to one or more other types of data/traffic (e.g., eMBB) that may have higher maximum latency requirements. Although in general, as noted, the BS or network may use a variety of different factors or criteria in determining whether specific data is a priority (or high priority) or not.

According to an example implementation, a BS may preempt an ongoing non-priority (e.g., eMBB) transmission with a priority (e.g., LLC or low latency communications) transmission. In an example implementation, the priority (e.g., LLC) data and the non-priority (e.g., eMBB) data may be directed to or addressed to a same UE or to different UEs (in the general case these data may be directed to different UEs). By preempting an ongoing downlink data transmission of the non-priority (or lower priority) data with a transmission of a priority (e.g., LLC) data, this may allow, for example, the priority data to be transmitted and received at a UE in a shorter period of time, as compared to waiting until the non-priority transmission has completed. Thus, at least in some cases, preempting an ongoing non-priority (or lower priority) data transmission with a priority (e.g., LLC) downlink data transmission may allow the priority data to be transmitted and received before exceeding the maximum latency for the priority data, which may be very short compared to the maximum latency for the non-priority (e.g., eMBB) data. LLC and eMBB may be used as illustrative examples of a priority data and a non-priority data, but other types of data may be used as well, as these are merely examples.

For example, a BS may schedule and begin transmitting an eMBB downlink data transmission via a long transmission time interval (TTI), such as via a slot or subframe (e.g., 7 or 14 symbols). Thus, the eMBB data transmission may be scheduled by the BS with a long TTI. According to an example implementation, during an ongoing eMBB (e.g., non-priority) data transmission (e.g., after the eMBB data has been scheduled and/or after eMBB data transmission has begun, and before it has completed for the long TTI), the BS may detect (e.g., may receive) LLC (or priority) data for downlink transmission, e.g., for a different UE than the eMBB data. For example, based on a shorter maximum latency, the LLC may be considered by the BS as a priority downlink data transmission. In this case, waiting for the BS to complete the downlink data transmission of the eMBB (e.g., non-priority) data on the long TTI, before transmitting the LLC data, may cause the LLC (low latency communications) data to exceed its maximum latency. Therefore, according to an example implementation, the BS may preempt the ongoing eMBB (or priority) data transmission, and may then schedule and immediately transmit the LLC data on a short TTI (e.g., mini-slot) on resources that were previously allocated for or scheduled for the downlink eMBB data transmission. Thus, one or more of these resources (e.g., the 1-3 symbols of the mini-slot to be used for transmission of the LLC data) may be resources that are reallocated by the BS from the non-priority eMBB data transmission to the priority LLC data transmission, for example. Thus, in this illustrative example, transmission of the LLC data is an example of a priority data transmission that preempts the ongoing downlink transmission of a non-priority (or lower priority) data (e.g., the eMBB data).

Preempting an ongoing eMBB (non-priority) transmission with a LLC (priority) transmission may include one or more (or even all) of the following, by way of illustrative example: ceasing a transmission of the ongoing (eMBB/non-priority) transmission from the base station to a first user device; sending, by the base station, downlink control information indicating an allocation of a set of resources for the priority (e.g., LLC) downlink transmission, the first set of resources previously allocated for ongoing non-priority (e.g., eMBB) data transmission; and sending, by the base station to a second user device, a priority (e.g., LLC) downlink data transmission via the first set of resources that were previously allocated for non-priority (e.g., eMBB) data transmission.

Furthermore, based on the preempting (e.g., puncturing) of a (e.g., an ongoing non-priority) downlink data transmission in favor of a priority downlink data transmission, the BS may also allocate a set of resources for a priority uplink transmission, where the set of resource allocated (or reallocated) for the priority uplink transmission may have been previously indicated by the BS for other user (e.g., BS may have previously indicated that these resources, now allocated for priority UL transmission, were previously allocated or scheduled for a downlink transmission).

Figure 3:
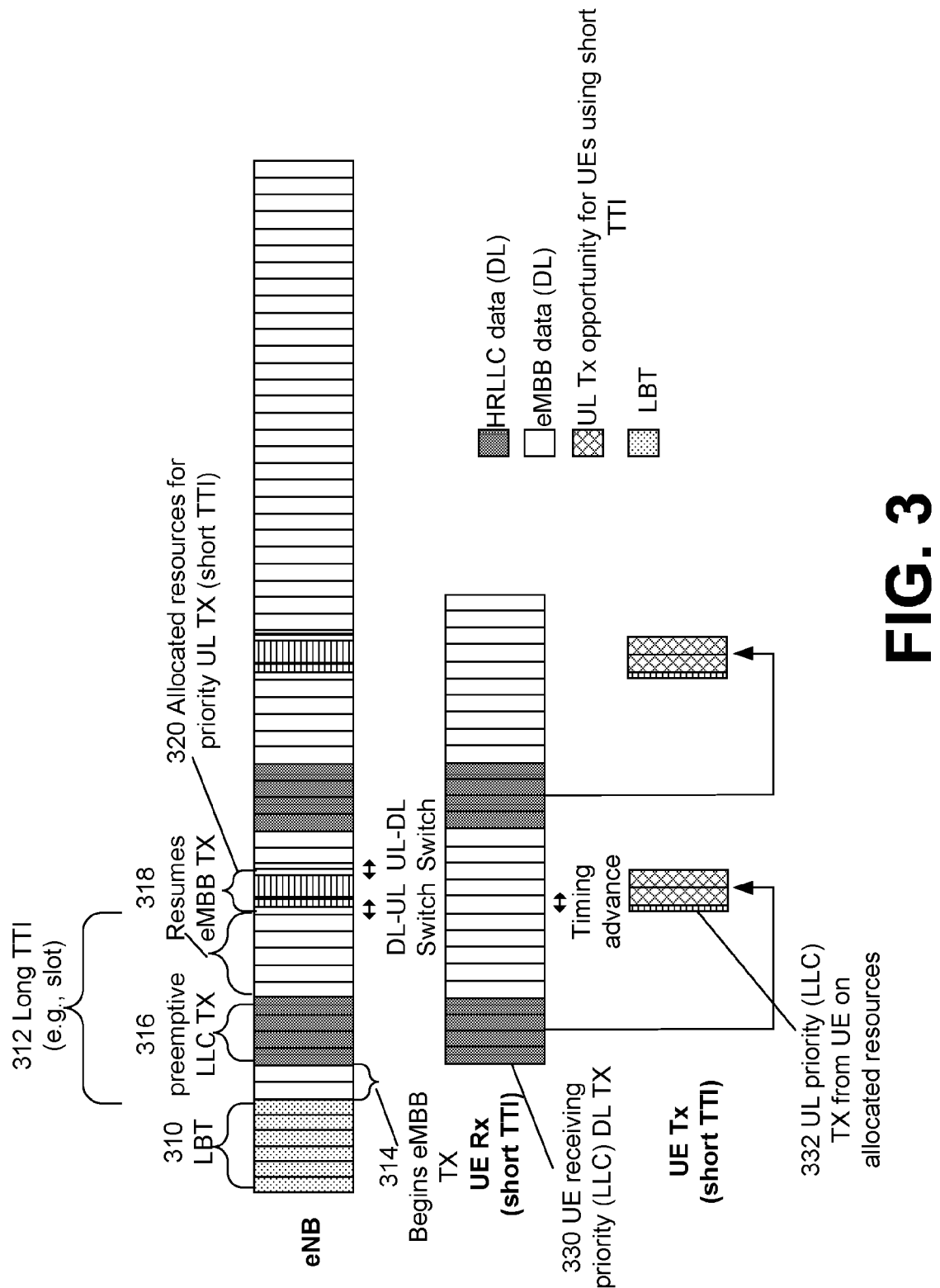
FIG. 3 is a diagram illustrating a base station (BS) preempting an ongoing eMBB downlink data transmission with a LLC downlink data transmission, and an allocation of uplink resources for a priority uplink transmission according to an example implementation.

FIG. 3 is a diagram illustrating a base station (BS) preempting an ongoing eMBB downlink data transmission with a LLC downlink data transmission, and an allocation of uplink resources for a priority uplink transmission according to an example implementation. After a listen before talk (LBT) period 310 to confirm the wireless channel is available, the BS (eNB) begins transmitting non-priority (eMBB) data at 314, within a long TTI 312. For example, the resources of the long TTI 312 may be been previously indicated by the BS as allocated or scheduled for the non-priority (eMBB) transmission to a first UE, for example. Priority (LLC) data for a second UE may be detected (e.g., received) by the BS, e.g., after the eMBB data have been scheduled for the first UE and the non-priority (eMBB) downlink data transmission at 314 has begun. Because the detected LLC data (detected or received by the BS) is considered by the BS/eNB to be a (higher) priority over the eMBB data (e.g., based on a shorter maximum latency for LLC data), the BS preempts (e.g., including puncturing of the eMBB data) the ongoing non-priority (eMBB) downlink data transmission to the first UE within long TTI 312 with a transmission of downlink priority (LLC) data to a second UE at 316 within a short TTI (e.g., mini-slot), which is within the long TTI 312. At 330, the second UE receives the (preemptive) priority (LLC) downlink data transmission.

According to an example implementation, the BS preempting an ongoing non-priority (e.g., eMBB) downlink data transmission with a priority (e.g., LLC) downlink data transmission may include, for example, one or more of the following by way of illustrative example: the BS ceasing (stopping or halting) a transmission of the ongoing non-priority (e.g., eMBB) transmission within the long TTI 312; sending, by the base station, downlink control information indicating an allocation of a first set of resources (shown as the resources within the short TTI 316) for the priority (e.g., LLC) downlink transmission, the first set of resources (for short TTI 316) were previously allocated (and indicated by the BS as being allocated or scheduled) for the non-priority (e.g., eMBB) data transmission; and sending, by the base station, a priority (e.g., LLC) downlink data transmission via the first set of resources (at 316) that were previously allocated for non-priority (e.g., eMBB) data transmission.

In addition to providing preemption of an ongoing (e.g., eMBB) downlink transmission for a priority (e.g., LLC) downlink transmission, preemption may also be performed in favor of a priority uplink transmission. For example, referring to FIG. 3, based on the preempting of the ongoing non-priority (e.g., eMBB) downlink data transmission in favor of a priority (e.g., LLC) downlink data transmission, the BS may also allocate a set of resources 320 for a priority uplink transmission via a short TTI (e.g., mini-slot), where the set of resources 320 allocated (or reallocated) for the priority uplink transmission may have been previously indicated by the BS for other use (e.g., BS may have previously indicated that these resources 320, now allocated for priority UL transmission, were previously allocated or scheduled for a downlink transmission or for a transmission to another UE). For example, as shown in FIG. 3, at 332, the second UE may perform a priority uplink transmission via the resources 320 that have been allocated for the priority uplink transmission.

In an example implementation, the second UE may need to provide relatively quick HARQ feedback (e.g., including either a HARQ Acknowledgement (HARQ ACK) or a HARQ negative acknowledgement (HARQ NACK)) with respect to the preemptive priority downlink data that was transmitted to the second UE at 316. For example, delaying the HARQ feedback until after the end of the long TTI 312 (or later) may, at least in some cases, prevent a retransmission of the (preemptive) priority downlink data, if that becomes necessary. Thus, it may be useful for the BS to allocate resources (e.g., resources 320 in FIG. 3) for a priority uplink transmission, which may preempt a previously indicated use of such resources. In an example implementation, the resources allocated for priority uplink transmission may be the same or different frequency resources (e.g., same or different subcarriers) as used for the priority downlink data transmission at 316.

According to an example implementation, the resources (e.g., resources 320) allocated for the priority uplink transmission may have been previously indicated by the BS for other use. For example, the resources 320 may be been previously indicated as being allocated for or scheduled for a downlink data transmission for another UE, by way of illustrative example. For example, downlink control information may have previously indicated an uplink/downlink (UL/DL) configuration for a frame that indicates resources 320 are allocated or scheduled for a downlink data transmission. Or, downlink control information may have previously indicated a slot type (e.g., see FIG. 2) where the resources 320 within the slot or long TTI have been allocated or scheduled for downlink data transmission, for example. Or, in another example implementation, the BS may have used enhanced Interference Mitigation and Traffic Adaptation (eIMTA), which allows for dynamic adaptation of the TDD pattern or UL/DL configuration in response to varying capacity requirements in uplink and downlink, to indicate that resources 320 were previously allocated or scheduled for a downlink transmission. Other messages may have been used by the BS to previously indicate that the resources 320 were previously allocated for other use. As noted, these resources 320, previously indicated for other use, are now allocated by the BS for a priority uplink transmission, based on the BS preempting of a (e.g., eMBB) downlink data transmission with a priority (e.g., LLC) downlink data transmission. Thus, according to an example implementation, the preemptive scheduling of the priority (e.g., LLC) downlink data transmission to the second UE, which preempts an ongoing non-priority (or lower priority) data transmission, may cause a need for a quick allocation of an uplink resource or uplink transmission opportunity for the second UE that received the preemptive priority (e.g., LLC) downlink data transmission, e.g., to allow the second UE to send HARQ feedback or other information to the BS. Thus, the BS may allocate resources (e.g., resources 320) for the priority uplink transmission from the second UE that received the priority downlink transmission.

In addition to allocating resources 320 that are reserved for the second UE (that received the preemptive priority (e.g., LLC) downlink data transmission) to send a priority uplink transmission, the BS may also allocate (e.g., contention-based) resources to allow one or more other UEs to send an uplink transmission to the BS. These two sets of uplink resources (reserved resources for the second UE to send HARQ feedback) and contention-based resources to allow other UE to send an uplink transmission to the BS) may be, for example: 1) sets of resources that have a same frequency resource (e.g., same subcarrier(s)) and different time resources (e.g., different symbols); 2) sets of resources that have same frequency resources (e.g., same subcarrier(s)) and different time resources; and 3) sets of resources that use different code resources (e.g., use different spreading codes or orthogonal cover codes). Thus, the set of reserved uplink resources and the set of contention-based resources, allocated by the BS in response to or based upon the preempting of the downlink transmission, may have a same or different time resources, frequency resources and/or code resources.

In an example implementation, the reserved uplink resources may be directed to the second UE by transmitting downlink control information to the second UE via UE-specific downlink control information or UE-specific PDCCH (physical downlink control channel), e.g., where a portion of the downlink control information may be scrambled based on the second UE's UE identifier or Radio Network Temporary Identifier (RNTI). On the other hand, the contention based resources may be indicated to one or more UEs by use of common downlink control information or common PDCCH that may be received by all or many UEs, for example.

In general, the resources (e.g., 320) that have been allocated for an uplink transmission (which were previously indicated by the BS for other use, such as being previously indicated for downlink transmission) may be used by a UE to transmit one or more of the following: a hybrid ARQ (HARQ) feedback, including at least one of a HARQ Acknowledgement (HARQ ACK) and a HARQ negative acknowledgement (HARQ NACK); a scheduling request (SR); a channel state information (CSI) that includes one or more of a channel quality indicator (CQI), a precoding matrix indicator (PMI) and a rank indication (RI); a buffer status report (BSR) for the user device; a random access request; user plane data; and control plane data.

Also, according to an example implementation, the priority downlink transmission at 316 (FIG. 3) (which preempts the non-priority downlink data transmission) may include a control part (or downlink control information) that indicates the allocated downlink resources (316) that have been allocated or scheduled for the priority downlink data transmission, and the priority (e.g., LLC) data.

As noted, uplink preemption may be provided, e.g., in which the BS may allocate (or reallocate) resources (e.g., resources 320, which were previously indicated for other use) for an uplink transmission, based on the BS preempting a downlink data transmission with a priority downlink data transmission. Various techniques may be used by a BS to allow a UE to determine the resources (e.g., 320) that have been allocated for the uplink transmission. According to an illustrative example implementation, the BS may either implicitly or explicitly identify the resources (e.g., 320) allocated for the uplink transmission.

Example Implicit Indication of uplink resources: According to an example implementation, in an example implicit technique, a UE may determine the resources or location of resources (320) for uplink transmission based on the size of the downlink resources (e.g., 316) for the preemptive downlink data transmission. For example, a symbol offset or resource offset may be determined for the uplink resources 320 with respect to the downlink resources 316, based on a size of the preemptive downlink data transmission. In an illustrative example, more time may be needed by the UE process a larger amount of downlink data. Thus, a larger preemptive downlink data transmission may implicitly indicate a larger symbol offset or resource offset for the allocated uplink resources 320. For example, the preemptive priority (e.g., LLC) downlink data transmission may be either 2 or 4 symbols, where the allocated uplink resources 320 are provided at a symbol offset of 8 symbols or 16 symbols, respectively. Thus, if the downlink control information indicates resources 316 for preemptive priority (e.g., LLC) data transmission of 8 symbols, then the uplink resources 320 (e.g., UL resources 320 provided for the second UE to provide priority HARQ feedback, and possibly other frequency resources, at the same time, for other UEs to send an UL transmission) would be provided at a resource (or symbol) offset of 8 symbols later. Or, if the downlink control information indicates resources 316 for preemptive priority (e.g., LLC) data transmission of 16 symbols, then the uplink resources 320 would be provided at a resource (or symbol) offset of 16 symbols later, for example. In this manner, the BS may implicitly indicate the location of the uplink resources 320 that preempt another use of such resources (e.g., which were previously indicated for downlink transmission, for example). In this manner, the second UE (that received the preemptive priority (e.g., LLC) downlink data transmission) may determine the UL resources 320 that may be used to send HARQ feedback to the BS for the priority downlink data transmission, and possibly for other UEs to determine resources to send an uplink transmission to the BS.

Example Explicit Indication of uplink resources: Alternatively, the BS may include within the control part or downlink control information of the priority downlink transmission at 316, an explicit indication of the UL resources 320 that the second UE may use to send HARQ feedback or other information (and possibly identify resources that may be used by other UEs to send an UL transmission to the BS). For example, the downlink control information or control part of the priority downlink transmission may include a symbol offset field that indicates an offset between the start of the resources for the preemptive priority downlink data transmission and the resources (320) for the preemptive uplink transmission. For example, a symbol offset field set to 0 may indicate a symbol offset of 8 symbols, whereas a symbol field offset set to 1 may indicate a symbol offset of 16 symbols. These are merely some illustrative examples, and other values and examples may be used.

Based on either the implicit technique or the explicit technique, or other technique, the second UE (that received the preemptive priority (e.g., LLC) downlink data transmission) may determine the UL resources 320 that may be used to send HARQ feedback. Also, based on the implicit or explicit technique, other UEs may also determine resources (e.g., same symbol offset, but different frequency resources as the HARQ feedback resources for second UE) that may be used to send an UL transmission to the BS.

Therefore, according to an example implementation, the BS/eNB may puncture an ongoing eMBB transmission on unlicensed spectrum using long TTI (e.g. 14 symbol) with (or in favor of) priority, e.g., LLC (such as HRLLC or URLLC) data using shorter TTI (e.g., 2 symbol). The BS is scheduling LLC data transmission using a specific PDCCH and/or DCI introduced for scheduling transmission with shorter TTI.

When scheduling LLC data transmission in DL, the BS/eNB can also schedule HRLLC UL data transmissions that overlap in time (e.g., but on different frequency resources) with an ongoing eMBB data transmission, or at least with an ongoing DL transmission burst in unlicensed spectrum. For example, these UL resources may be used by the second UE or target UE of the priority downlink data transmission to provide priority HARQ feedback with respect to the priority (e.g., LLC) downlink data transmission.

The BS/eNB may also signal via a specifically introduced common DCI (downlink control information) the occurrence of an UL opportunity (e.g., UL resources) for the transmission of UL control information and/or grant-less uplink transmissions by other UEs supporting short TTI transmission and that are decoding/monitoring the common DCI.

The BS/eNB blanks/mutes (e.g., ceases) all DL eMBB transmissions that are overlapping with the UL opportunity associated with the HRLCC data and/or uplink control information. When blanking/muting DL eMBB transmissions, the eNB also considers the time needed to perform Tx-Rx (transmit-receive) switching and vice versa—including the time that may be required to perform LBT (listen before talk) at either the BS/eNB or the UE as well as including any time needed to compensate for time advance.

The occurrence of an UL opportunity for UEs using short TTI can be signaled in a similar manner as the subframe configuration is signaled for long TTI. The subframe configuration for short TTI may also indicate the occurrence of DL transmission using short TTI in upcoming DL transmission opportunities.

UEs that are decoding the subframe configuration for short TTI transmissions may assume the short TTI configuration if contradiction occurs between the latter and a previously signaled subframe configuration for long TTI.

As shown in the example of FIG. 3, the punctured (preempted) LLC (e.g., HRLLC) DL (downlink) transmission may be used by the BS to create an UL transmission opportunity for the transmission of uplink control information such as HARQ ACK feedback for the LLC DL transmissions and possibly LLC UL data transmissions for other UEs.

In one example implementation, the HRLLC transmission may include both a control part and a data part for the downlink. Through this DL grant and corresponding data, the UE may be able to derive or determine the UL resources (e.g., the exact symbol or time) where/when the associated UL control signaling should be sent. This would correspond to implicit allocation of UL resources.

In another example implementation, the HRLLC control part may contain an explicit grant for the UL control resources, where the signaling in the control message can contain information on the exact timing and frequency resources to use for the UL transmission of the control signaling (normally denoted PUCCH/physical uplink control channel). Such signaling may be provided using either (a) a common control channel, (b) Simplified control signaling with limited states that trigger a higher layer configuration to be applied (RRC/radio resource control based information that is pre-delivered). It should be noted that the DL payload/data part may also contain control signaling to indicate the UL transmission possibility (for instance through a MAC (media access control) control element).

In another example implementation, the DL control part of the HRLLC transmission may contain an explicit grant for UL data transmissions (PUSCH). For such cases, the explicit grant may contain the exact time and frequency resources that are allocated for UL data transmission, potentially including the time-span of the valid resources (basically indicating a commitment from the eNB (or gNB) of when non-transmission will happen from eNB (or gNB) side).

In another example implementation, the common PDCCH (common control signaling) may indicate the commitment of non-transmission/blanking from BS/eNB side in the sense that any HRLLC UE may be allowed to transmit either UL control (PUCCH), scheduled UL data (PUSCH) or grantless UL (or autonomous UL) data. Such non-transmission instants could also be used by HRLLC UL UEs to transmit either scheduling request (SR) or random access preambles. Such solution would allow for shorter UL access latencies.

In one example implementation, the control signaling for HRLLC transmissions is conveyed in a format that allows normal scheduled UEs to discover that HRLLC UEs have been scheduled (and that eNB does blanking of certain symbols to allow for either DL or UL transmissions). Such discovery will assist the normal scheduled UEs to take corrective actions (wait for automatic retransmissions, perform local compensation of decoding procedures, etc.).

In one example implementation, the HRLLC control signaling for muting HRLLC UL transmissions may also cause normal UL scheduled UEs to halt their UL transmissions.

In one example implementation, the HRLLC UL transmissions take place in such a way that they are able to block normal scheduled UL transmissions (for instance by either eNB transmitting for longer than planned to block the UL transmission, or by the HRLLC UEs to start transmissions earlier to block the LBT/listen before talk procedure for the normal scheduled UL transmissions).

Figure 4:
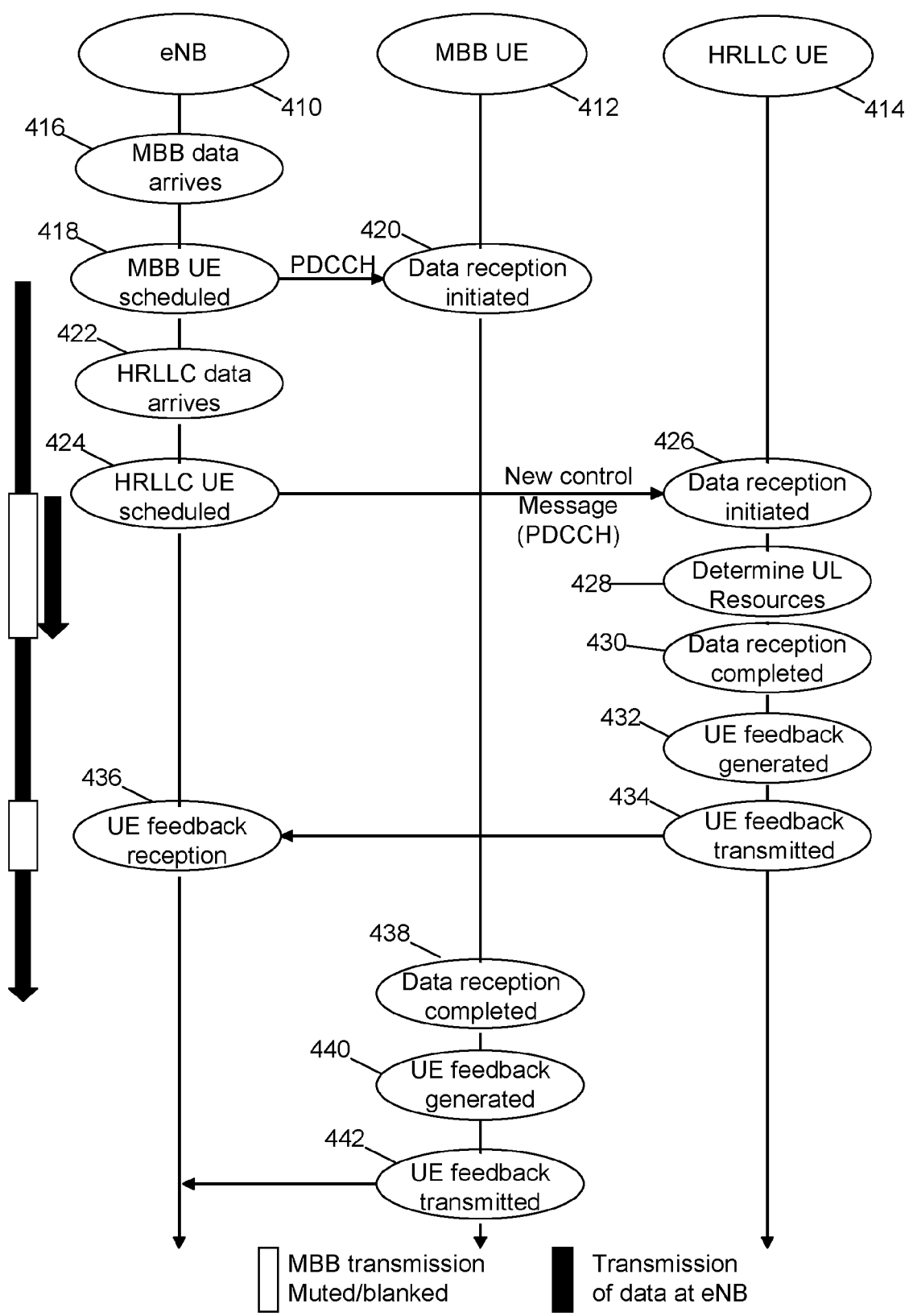
FIG. 4 is a diagram illustrating operation of a system according to an example implementation.

FIG. 4 is a diagram illustrating operation of a system according to an example implementation. A BS (eNB) 410 is connected to or in communication with a eMBB UE 412 and a LLC UE 414. At 416, the BS 410 receives the eMBB data for transmission. At 418, the BS 410 schedules the eMBB UE 412 for downlink data transmission of the eMBB data. At 420, the eMBB UE 412 begins receiving the eMBB data. At 422, the BS 410 receives LLC data for the LLC UE 414.

At 424, the BS 410 schedules the LLC UE for data transmission, and sends a LLC downlink transmission including DCI (downlink control information) that indicates resources for the LLC data transmission (which preempts a portion of the eMBB transmission to eMBB UE 412), and the LLC downlink data transmission. The DCI of the LLC preemptive downlink transmission may include, for example, an explicit indication of uplink resources that may be used by the LLC to provide HARQ feedback for the downlink LLC data transmission.

At 426, the LLC UE receives the LLC downlink transmission including the control part (e.g., DCI) and the data part (LLC data). At 428, the LLC UE may determine the UL resources (e.g., see UL resources 320, FIG. 3) that may be used by the LLC UE 414 to send HARQ feedback to the BS 410. For example, either an explicit technique or an implicit technique, for example, may be used by the LLC UE 414 to determine the UL resources for HARQ feedback. At 430, the LLC UE data reception at the LLC UE is completed. At 432, UE HARQ feedback is generated (e.g., based on whether the LLC UE 414 can decode the received LLC data), and the HARQ feedback is sent at 434 via the determined UL resources to the BS 410. The eMBB downlink data transmission (which was preempted by the LLC downlink data transmission at 424, 426, 428 and 430) now resumes, and the eMBB downlink data transmission is completed, and the eMBB UE 412 completes the eMBB downlink data reception at 438. At 440 and 442, the eMBB UE 412 generates and sends is HARQ feedback to the BS 410.

Figure 5:
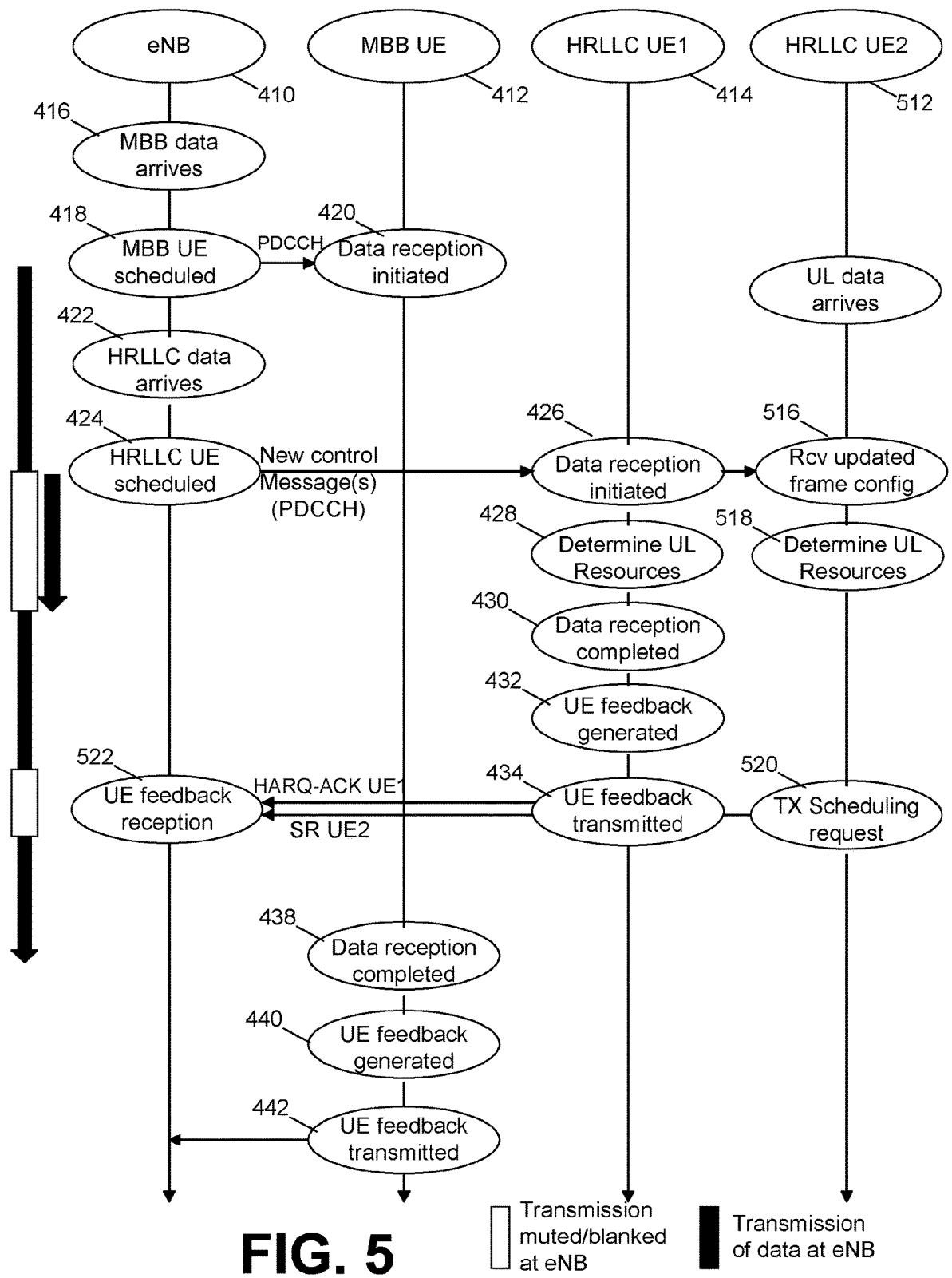
FIG. 5 is a diagram illustrating operation of a system according to another example implementation.

FIG. 5 is a diagram illustrating operation of a system according to an example implementation. A BS (eNB) 410 is connected to or in communication with a eMBB UE 412, a LLC UE1 414, and a LLC UE2 512. The differences in FIG. 5 with respect to FIG. 4 will be briefly described. As noted above, at 426, the LLC UE1 414 receives the preemptive LLC downlink transmission (which preempts the eMBB data transmission) including the control part (e.g., DCI) and the data part (LLC data). At 428, the LLC UE1 414 may determine the UL resources (e.g., see UL resources 320, FIG. 3) that may be used by the LLC UE1 414 to send HARQ feedback to the BS 410. For example, either an explicit technique or an implicit technique, for example, may be used by the LLC UE 414 to determine the UL resources for HARQ feedback. For example, the UE1 414 may receive the UE-specific DCI (e.g., where a portion of the DCI may be scrambled with the RNTI of the UE1 414, to allow only the UE1 414 to receive the UE specific DCI, indicating the reserved UL resources allocated to or reserved for the UE1 414 for UL transmission of its HARQ feedback).

In an example implementation, the LLC UE2 512 may use a slightly different procedure to determine the UL resources that may be used for UL transmission to the BS. For example, a grant for a contention-based UL resource may be indicated via common DCI, which may be received and decoded by LLC UE2 512, for example. Thus, a new UL frame configuration may be indicated via common DCI that may indicate that certain resources within a frame are now allocated for UL transmission. At 518, the UE2 512 may then determine these UL resources, e.g., based on common DCI. At 520, the LLC UE2 may contend and then perform an UL transmission via these contention-based resources. UE2 may transmit different types of information, such as buffer status report (BSR), a scheduling request (SR), a random access request, data, or other information. Thus, the priority (e.g., LLC) UE2 may also obtain and transmit on priority UL resources that have been granted or allocated by the BS based on the BS preempting of a (non-priority) downlink data transmission with a priority (e.g., LLC) downlink data transmission. At 522, the BS 410 may receive the HARQ feedback from UE1 414 and the UL transmission from the UE2 512.

Example 1

Figure 6:
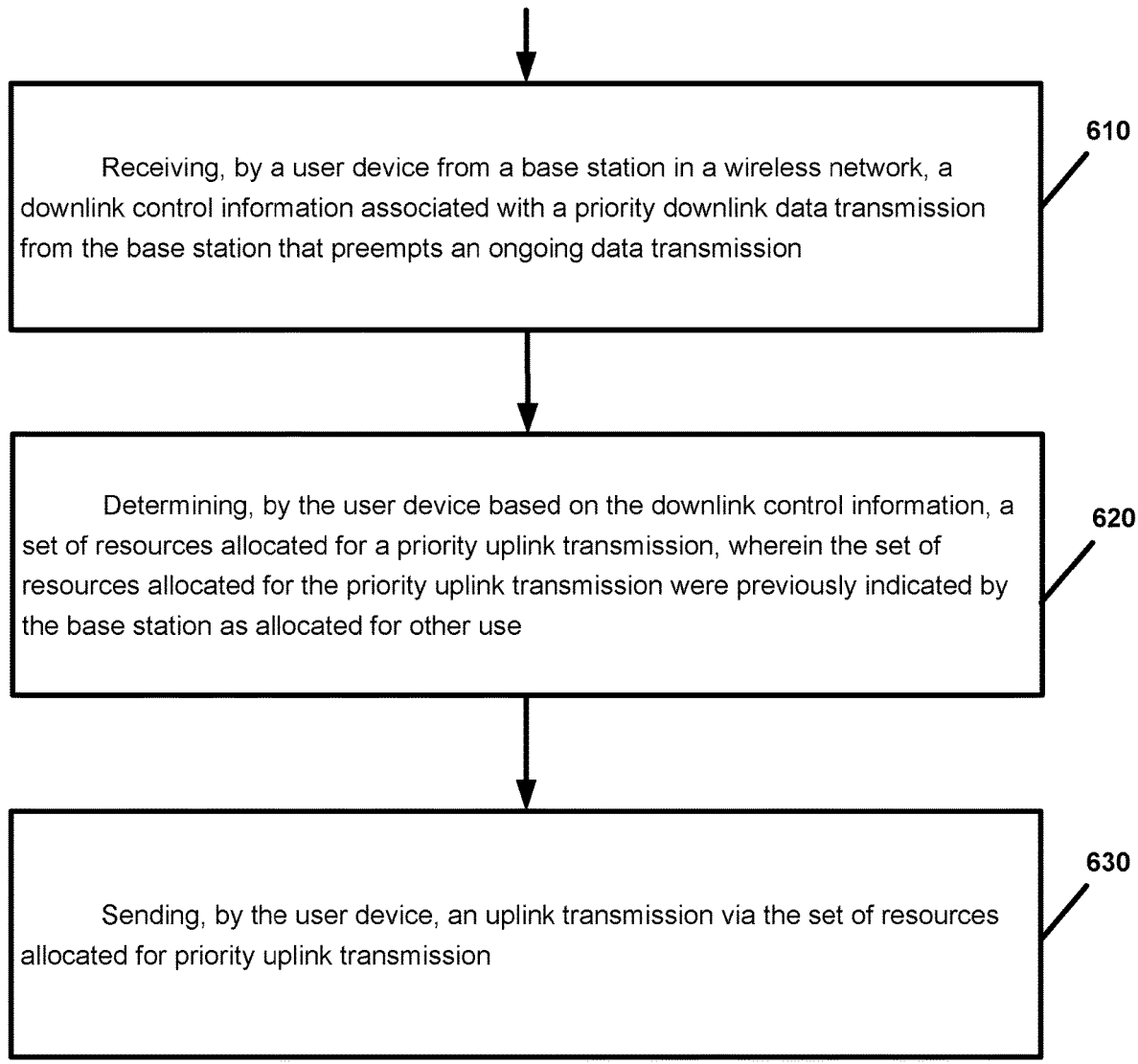
FIG. 6 is a flow chart illustrating operation of a user device according to an example implementation.

FIG. 6 is a flow chart illustrating operation of a user device according to an example implementation. Operation 610 includes receiving, by a user device from a base station in a wireless network, a downlink control information associated with a priority downlink data transmission from the base station that preempts an ongoing data transmission. Operation 620 includes determining, by the user device based on the downlink control information, a set of resources allocated for a priority uplink transmission, wherein the set of resources allocated for the priority uplink transmission were previously indicated by the base station as allocated for other use. And, operation 630 includes sending, by the user device, an uplink transmission via the set of resources allocated for priority uplink transmission.

Example 2

According to an example implementation of example 1, wherein the determining, by the user device based on the downlink control information, the set of resources allocated for the priority uplink transmission comprises: determining a resource offset or a symbol offset that identifies the set of resources allocated for the priority uplink transmission.

Example 3

According to an example implementation of any of examples 1-2, and further comprising: receiving, by the user device via resources indicated by the downlink control information, the priority downlink data transmission from the base station that preempts the ongoing downlink data transmission from the base station.

Example 4

According to an example implementation of any of examples 1-3, wherein the sending, by the user device, an uplink transmission via the set of resources allocated for priority uplink transmission comprises the user device sending a hybrid ARQ (HARQ) feedback, including at least one of a HARQ Acknowledgement (HARQ ACK) and a HARQ negative acknowledgement (HARQ NACK).

Example 5

According to an example implementation of any of examples 1-4, wherein the sending, by the user device, an uplink transmission via the set of resources allocated for priority uplink transmission comprises the user device sending at least one of the following to the base station: a hybrid ARQ (HARQ) feedback, including at least one of a HARQ Acknowledgement (HARQ ACK) and a HARQ negative acknowledgement (HARQ NACK); a scheduling request (SR); a channel state information (CSI) that includes one or more of a channel quality indicator (CQI), a precoding matrix indicator (PMI) and a rank indication (RI); a buffer status report (BSR) for the user device; a random access request; user plane data; and control plane data.

Example 6

According to an example implementation of any of examples 1-5, wherein the priority downlink data transmission is addressed to the user device, the user device performing the following: receiving, by the user device via a first set of resources indicated by the downlink control information provided via dedicated signaling that is directed to the user device, the priority downlink data transmission from the base station that preempts an ongoing downlink data transmission from the base station; determining, by the user device based on the downlink control information, a second set of resources that have been reserved for the user device to send a priority uplink transmission, wherein the second set of resources were previously indicated by the base station as allocated for downlink transmission; and wherein the sending comprises sending, by the user device, an uplink transmission via the second set of resources that have been reserved for the user device for uplink transmission.

Example 7

According to an example implementation of any of examples 1-6, wherein the user device comprises a first priority user device, wherein the priority downlink data transmission is addressed to a second user device, the method comprising the first user device performing the following: receiving, by the first user device from the base station, downlink control information associated with a priority downlink data transmission from the base station to the second user device that preempts an ongoing downlink data transmission from the base station to a third user device; determining, by the first user device based on the downlink control information, a second set of contention-based resources for a priority uplink transmission, wherein the second set of resources were previously indicated by the base station as allocated for downlink transmission; and sending, by the first user device, an uplink transmission via the second set of contention-based resources.

Example 8

According to an example implementation of any of examples 1-7, wherein the receiving comprises receiving, by a user device from a base station in a wireless network, a downlink control information associated with an allocation of a first set of resources for a high priority downlink data transmission from the base station that preempts a scheduled low priority downlink data transmission from the base station; wherein the determining comprises determining, by the user device based on the downlink control information, a second set of resources allocated for a high priority uplink transmission, wherein the second set of resources allocated for a high priority uplink transmission were previously indicated by the base station as allocated for downlink transmission; and wherein the sending comprises sending, by the user device, an uplink transmission via the second set of resources allocated for high priority uplink transmission.

Example 9

According to an example implementation of any of examples 1-8, wherein the downlink control information indicates a first set of resources allocated for a priority downlink data transmission that preempts an ongoing downlink data transmission.

Example 10

According to an example implementation of any of examples 1-9, wherein the determining comprises: determining, by the first user device based on the downlink control information, a second set of resources for the priority uplink transmission, wherein the second set of resources were previously indicated by the base station as allocated for a downlink transmission.

Example 11

According to an example implementation of any of examples 1-10, wherein the determining, by the user device based on the downlink control information, the second set of resources allocated for the priority uplink transmission comprises: determining a resource offset or a symbol offset between the first set of resources allocated for the priority downlink data transmission and the second set of resources allocated for the priority uplink transmission.

Example 12

According to an example implementation of any of examples 1-11, wherein the downlink control information indicates the first set of resources or a size of the first set of resources allocated for the priority downlink data transmission that preempts the ongoing downlink data transmission; and wherein the determining comprises determining, by the user device based on the first set of resources or the size of the first set of resources allocated for the priority downlink data transmission that preempts the ongoing downlink data transmission, the second set of resources allocated for the priority uplink transmission.

Example 13

Figure 7:
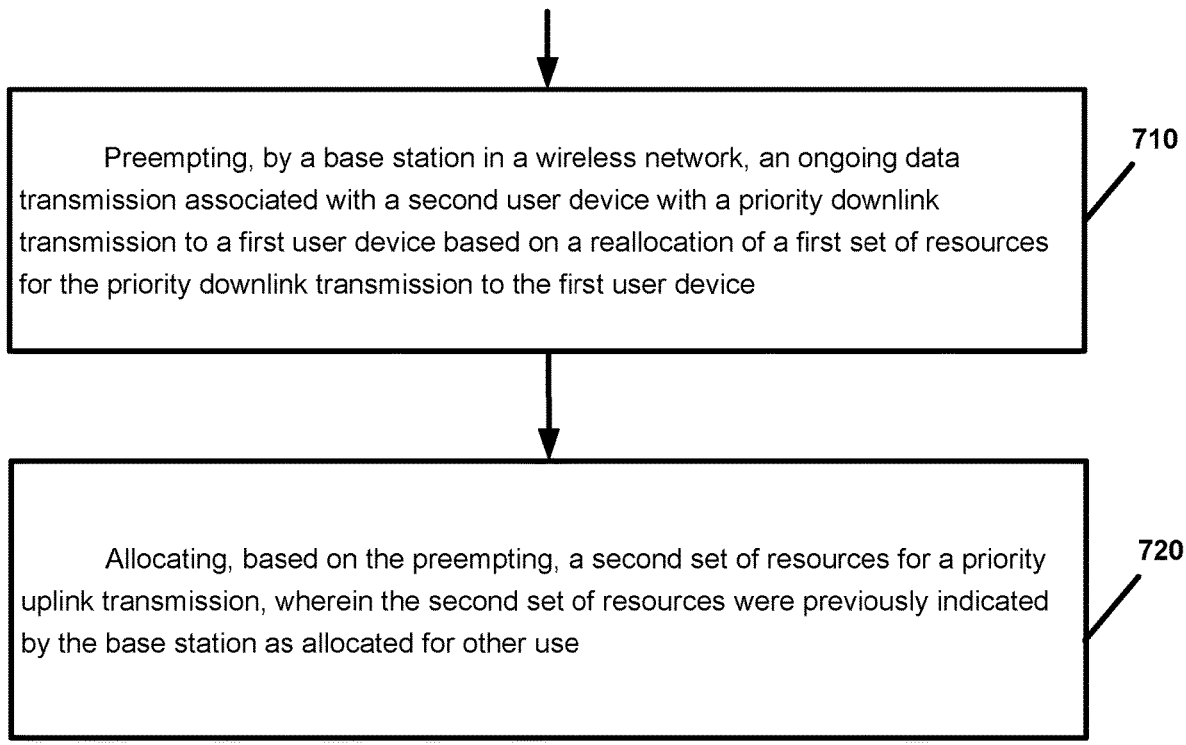
FIG. 7 is a flow chart illustrating operation of a base station according to an example implementation.

FIG. 7 is a flow chart illustrating operation of a base station according to an example implementation. Operation 710 includes preempting, by a base station in a wireless network, an ongoing data transmission associated with a second user device with a priority downlink transmission to a first user device based on a reallocation of a first set of resources for the priority downlink transmission to the first user device. And, operation 720 includes allocating, based on the preempting, a second set of resources for a priority uplink transmission, wherein the second set of resources were previously indicated by the base station as allocated for other use.

Example 14

According to an example implementation of example 13, wherein the preempting is performed in response to receiving, by the base, priority data for the first user device.

Example 15

According to an example implementation of any of examples 13-14, wherein the ongoing data transmission associated with the second user device comprises at least one of the following: an ongoing downlink data transmission from the base station to the second user device; and an ongoing uplink data transmission from the second user device to the base station.

Example 16

According to an example implementation of any of examples 13-15, wherein the preempting comprises: ceasing a transmission of the ongoing transmission from the base station to the second user device; sending, by the base station, downlink control information indicating an allocation of the first set of resources for the priority downlink transmission to the first user device, the first set of resources previously allocated for ongoing data transmission to the second user device; and sending, by the base station to the first user device, a priority downlink data transmission via the first set of resources that were previously allocated for data transmission to the second user device.

Example 17

According to an example implementation of any of examples 13-16, wherein the downlink control information includes resource location information indicating a location of the first set of resources.

Example 18

According to an example implementation of any of examples 13-17, wherein the downlink control information includes a symbol offset or resource offset that indicates a location of the second set of resources with respect to the first set of resources.

Example 19

According to an example implementation of any of examples 13-18, wherein a location or size of the second set of resources is based on the size of the first set of resources.

Example 20

According to an example implementation of any of examples 13-19, wherein the allocating a second set of resources for a priority uplink transmission comprises one or more of the following: allocating a third set of resources, reserved for the first user device, for a priority uplink transmission; and allocating a fourth set of contention-based resources for a priority uplink transmission.

Example 21

According to an example implementation of any of examples 13-20, wherein a relationship of the third and fourth sets of resources are at least one of the following: the third and fourth sets of resources use different time resources with a same frequency or subcarrier resource(s); the third and fourth sets of resources use different frequency or subcarrier resources during the same time; and the third and fourth sets of resources use different codes.

Example 22

According to an example implementation of any of examples 13-21, and further comprising: receiving, by the base station, a priority uplink transmission via the second set of resources.

Example 23

According to an example implementation of any of examples 13-22, wherein the receiving, by the base station, a priority uplink transmission via the second set of resources comprises at least one of the following: receiving, by the base station from the first user device, a priority uplink transmission via the second set of resources that were reserved for the first user device; and receiving, by the base station, a priority uplink transmission via the second set of resources from a user device that is different from the first user device.

Example 24

According to an example implementation of any of examples 13-23, wherein the receiving, by the base station, a priority uplink transmission via the second set of resources comprises receiving at least one of the following via the second set of resources: a hybrid ARQ (HARQ) feedback, including at least one of a HARQ Acknowledgement (HARQ ACK) and a HARQ negative acknowledgement (HARQ NACK); a scheduling request (SR); a channel state information (CSI) that includes one or more of a channel quality indicator (CQI), a precoding matrix indicator (PMI) and a rank indication (RI); a buffer status report (BSR) for the user device; a random access request; user plane data; and control plane data.

Example 25

An apparatus comprising means for performing a method of any of examples 1-24.

Example 26

An apparatus comprising at least one processor and at least one memory including computer instructions that, when executed by the at least one processor, cause the apparatus to perform a method of any of examples 1-24.

Example 27

An apparatus comprising a computer program product including a non-transitory computer-readable storage medium and storing executable code that, when executed by at least one data processing apparatus, is configured to cause the at least one data processing apparatus to perform a method of any of examples 1-24.

Example 28

An apparatus comprising at least one processor and at least one memory including computer instructions that, when executed by the at least one processor, cause the apparatus to: receive, by a user device from a base station in a wireless network, a downlink control information associated with a priority downlink data transmission from the base station that preempts an ongoing data transmission; determine, by the user device based on the downlink control information, a set of resources allocated for a priority uplink transmission, wherein the set of resources allocated for the priority uplink transmission were previously indicated by the base station as allocated for other use; and send, by the user device, an uplink transmission via the set of resources allocated for priority uplink transmission.

Example 29

The apparatus of example 28 wherein causing the apparatus to determine, by the user device based on the downlink control information, the set of resources allocated for the priority uplink transmission comprises causing the apparatus to: determine a resource offset or a symbol offset that identifies the set of resources allocated for the priority uplink transmission.

Example 30

The apparatus of any of examples 28-29 and further causing the apparatus to: receive, by the user device via resources indicated by the downlink control information, the priority downlink data transmission from the base station that preempts the ongoing downlink data transmission from the base station.

Example 31

The apparatus of any of examples 28-30 wherein causing the apparatus to send, by the user device, an uplink transmission via the set of resources allocated for priority uplink transmission comprises causing the user device to send a hybrid ARQ (HARQ) feedback, including at least one of a HARQ Acknowledgement (HARQ ACK) and a HARQ negative acknowledgement (HARQ NACK).

Example 32

The apparatus of any of examples 28-31 wherein causing the apparatus to send, by the user device, an uplink transmission via the set of resources allocated for priority uplink transmission comprises causing the apparatus to send, by the user device, at least one of the following to the base station: a hybrid ARQ (HARQ) feedback, including at least one of a HARQ Acknowledgement (HARQ ACK) and a HARQ negative acknowledgement (HARQ NACK); a scheduling request (SR); a channel state information (CSI) that includes one or more of a channel quality indicator (CQI), a precoding matrix indicator (PMI) and a rank indication (RI); a buffer status report (BSR) for the user device; a random access request; user plane data; and control plane data.

Example 33

The apparatus of any of examples 28-32 wherein the priority downlink data transmission is addressed to the user device, and further causing the apparatus to perform the following: receive, by the user device via a first set of resources indicated by the downlink control information provided via dedicated signaling that is directed to the user device, the priority downlink data transmission from the base station that preempts an ongoing downlink data transmission from the base station; determine, by the user device based on the downlink control information, a second set of resources that have been reserved for the user device to send a priority uplink transmission, wherein the second set of resources were previously indicated by the base station as allocated for downlink transmission; and wherein causing the apparatus to send comprises causing the apparatus to send, by the user device, an uplink transmission via the second set of resources that have been reserved for the user device for uplink transmission.

Example 34

The apparatus of any of examples 28-33, wherein the user device comprises a first priority user device, wherein the priority downlink data transmission is addressed to a second user device, further causing the first user device to perform the following: receive, by the first user device from the base station, downlink control information associated with a priority downlink data transmission from the base station to the second user device that preempts an ongoing downlink data transmission from the base station to a third user device;

determine, by the first user device based on the downlink control information, a second set of contention-based resources for a priority uplink transmission, wherein the second set of resources were previously indicated by the base station as allocated for downlink transmission; and send, by the first user device, an uplink transmission via the second set of contention-based resources.

Example 35

The apparatus of any of examples 28-34, wherein causing the apparatus to receive comprises causing the apparatus to receive, by a user device from a base station in a wireless network, a downlink control information associated with an allocation of a first set of resources for a high priority downlink data transmission from the base station that preempts a scheduled low priority downlink data transmission from the base station; wherein causing the apparatus to determine comprises causing the apparatus to determine, by the user device based on the downlink control information, a second set of resources allocated for a high priority uplink transmission, wherein the second set of resources allocated for a high priority uplink transmission were previously indicated by the base station as allocated for downlink transmission; and wherein causing the apparatus to send comprises causing the apparatus to send, by the user device, an uplink transmission via the second set of resources allocated for high priority uplink transmission.

Example 36

The apparatus of any of examples 28-35 wherein the downlink control information indicates a first set of resources allocated for a priority downlink data transmission that preempts an ongoing downlink data transmission.

Example 37

The apparatus of any of examples 28-36 wherein causing the apparatus to determine comprises causing the apparatus to: determine, by the first user device based on the downlink control information, a second set of resources for the priority uplink transmission, wherein the second set of resources were previously indicated by the base station as allocated for a downlink transmission.

Example 38

The apparatus of any of examples 28-37 wherein causing the apparatus to determine, by the user device based on the downlink control information, the second set of resources allocated for the priority uplink transmission comprises causing the apparatus to: determine a resource offset or a symbol offset between the first set of resources allocated for the priority downlink data transmission and the second set of resources allocated for the priority uplink transmission.

Example 39

The apparatus of any of examples 28-38 wherein the downlink control information indicates the first set of resources or a size of the first set of resources allocated for the priority downlink data transmission that preempts the ongoing downlink data transmission; and wherein causing the apparatus to determine comprises causing the apparatus to determine, by the user device based on the first set of resources or the size of the first set of resources allocated for the priority downlink data transmission that preempts the ongoing downlink data transmission, the second set of resources allocated for the priority uplink transmission.

Example 40

An apparatus comprising at least one processor and at least one memory including computer instructions that, when executed by the at least one processor, cause the apparatus to: preempt, by a base station in a wireless network, an ongoing data transmission associated with a second user device with a priority downlink transmission to a first user device based on a reallocation of a first set of resources for the priority downlink transmission to the first user device; and allocate, based on the preempting, a second set of resources for a priority uplink transmission, wherein the second set of resources were previously indicated by the base station as allocated for other use.

Example 41

The apparatus of example 40 wherein causing the apparatus to preempt comprises causing the apparatus to preempt in response to receiving, by the base, priority data for the first user device.

Example 42

The apparatus of any of examples 40-41 wherein the ongoing data transmission associated with the second user device comprises at least one of the following: an ongoing downlink data transmission from the base station to the second user device; and an ongoing uplink data transmission from the second user device to the base station.

Example 43

The apparatus of any of examples 40-42 wherein causing the apparatus to preempt comprises causing the apparatus to: cease a transmission of the ongoing transmission from the base station to the second user device; send, by the base station, downlink control information indicating an allocation of the first set of resources for the priority downlink transmission to the first user device, the first set of resources previously allocated for ongoing data transmission to the second user device; and send, by the base station to the first user device, a priority downlink data transmission via the first set of resources that were previously allocated for data transmission to the second user device.

Example 44

The apparatus of any of examples 40-43 wherein the downlink control information includes resource location information indicating a location of the first set of resources.

Example 45

The apparatus of any of examples 40-44 wherein the downlink control information includes a symbol offset or resource offset that indicates a location of the second set of resources with respect to the first set of resources.

Example 46

The apparatus of any of examples 40-45 wherein a location or size of the second set of resources is based on the size of the first set of resources.

Example 47

The apparatus of any of examples 40-46 wherein causing the apparatus to allocate a second set of resources for a priority uplink transmission comprises causing the apparatus to perform one or more of the following: allocate a third set of resources, reserved for the first user device, for a priority uplink transmission; and allocate a fourth set of contention-based resources for a priority uplink transmission.

Example 48

The apparatus of any of examples 40-47 wherein a relationship of the third and fourth sets of resources are at least one of the following: the third and fourth sets of resources use different time resources with a same frequency or subcarrier resource(s); the third and fourth sets of resources use different frequency or subcarrier resources during the same time; and the third and fourth sets of resources use different codes.

Example 49

The apparatus of any of examples 40-48 and further causing the apparatus to: receive, by the base station, a priority uplink transmission via the second set of resources.

Example 50

The apparatus of any of examples 40-49 wherein causing the apparatus to receive, by the base station, a priority uplink transmission via the second set of resources comprises causing the apparatus to perform at least one of the following: receive, by the base station from the first user device, a priority uplink transmission via the second set of resources that were reserved for the first user device; and receive, by the base station, a priority uplink transmission via the second set of resources from a user device that is different from the first user device.

Example 51

The apparatus of any of examples 49-50 wherein causing the apparatus to receive, by the base station, a priority uplink transmission via the second set of resources comprises causing the apparatus to receive at least one of the following via the second set of resources: a hybrid ARQ (HARQ) feedback, including at least one of a HARQ Acknowledgement (HARQ ACK) and a HARQ negative acknowledgement (HARQ NACK); a scheduling request (SR); a channel state information (CSI) that includes one or more of a channel quality indicator (CQI), a precoding matrix indicator (PMI) and a rank indication (RI); a buffer status report (BSR) for the user device; a random access request; user plane data; and control plane data.

Figure 8:
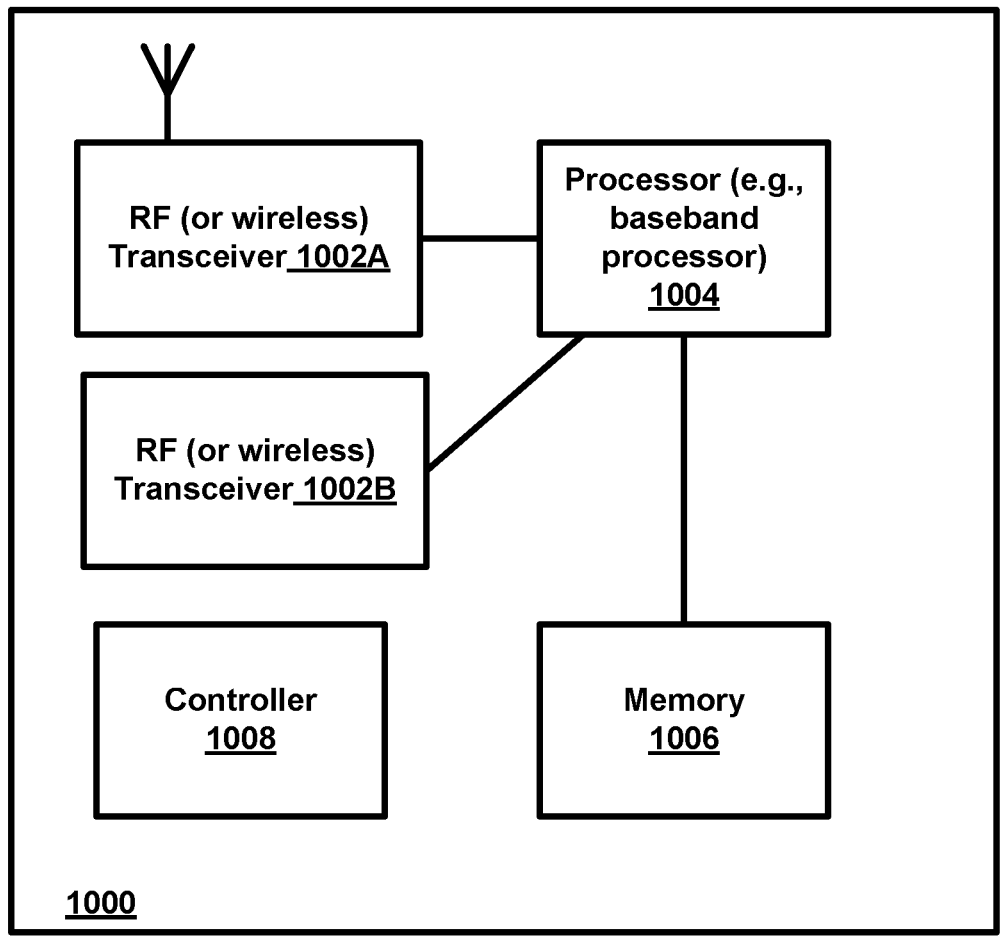
FIG. 8 is a block diagram of a node or wireless station (e.g., base station/access point or mobile station/user device) according to an example implementation.

FIG. 8 is a block diagram of a wireless station (e.g., AP, BS, relay node, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 8, a controller (or processor) 1008 may execute software and instructions, and may provide overall control for the station 1000, and may provide control for other systems not shown in FIG. 8, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

List of some example abbreviations:

| | |
|---|---|
| ACK | Acknowledgement |
| CE | Control Element |
| CS | Cyclic shift |
| CSI | Channel State Information |
| gNB | NR (new radio/5G) Base Station (BS) |
| HARQ | Hybrid Auto Repeat reQuest |
| LTE | Long Term Evolution |

| | |
|---|---|
| MAC | Medium Access Control |
| NACK | Negative ACK |
| NR | New Radio (5G) |
| PDSCH | Physical Downlink Shared Channel |
| PRB | Physical Resource Block |
| PUCCH | Physical Uplink Control Channel |
| PUSCH | Physical Uplink Control Channel |
| RRC | Radio Resource Control |
| SR | Scheduling Request |
| UE | User Equipment |

The invention claimed is:

1. An apparatus comprising at least one processor and at least one memory including computer instructions that, when executed by the at least one processor, cause the apparatus to:
receive, from a base station in a wireless network, a downlink control information associated with a priority downlink data transmission from the base station that preempts an ongoing data transmission;
determine, based on the downlink control information, a set of resources allocated for a priority uplink transmission, wherein the set of resources allocated for the priority uplink transmission were previously indicated by the base station as allocated for other use; and
send an uplink transmission via the set of resources allocated for the priority uplink transmission,
wherein causing the apparatus to send the uplink transmission via the set of resources allocated for priority uplink transmission comprises causing the apparatus to send a hybrid automatic repeat request (HARQ) feedback, including at least one of a HARQ Acknowledgement (HARQ ACK) or a HARQ negative acknowledgement (HARQ NACK).

2. The apparatus of claim 1 wherein causing the apparatus to determine, based on the downlink control information, the set of resources allocated for the priority uplink transmission comprises causing the apparatus to:
determine a resource offset or a symbol offset that identifies the set of resources allocated for the priority uplink transmission.

3. The apparatus of claim 1 and the computer instructions further causing the apparatus to:
receive, via resources indicated by the downlink control information, the priority downlink data transmission from the base station that preempts the ongoing downlink data transmission from the base station.

4. The apparatus of claim 1 wherein causing the apparatus to send the uplink transmission via the set of resources allocated for priority uplink transmission further comprises sending at least one of the following to the base station:
a scheduling request (SR);
a channel state information (CSI) that includes one or more of a channel quality indicator (CQI), a precoding matrix indicator (PMI) and a rank indication (RI);
a buffer status report (BSR) for the apparatus;
a random access request;
user plane data; or
control plane data.

5. The apparatus of claim 1 wherein the priority downlink data transmission is addressed to the apparatus, and further causing the apparatus to perform the following:
receive, via a first set of resources indicated by the downlink control information provided via dedicated signaling that is directed to the apparatus, the priority downlink data transmission from the base station that preempts an ongoing downlink data transmission from the base station;
determine, based on the downlink control information, a second set of resources that have been reserved for the apparatus to send the priority uplink transmission, wherein the second set of resources were previously indicated by the base station as allocated for downlink transmission; and
send an uplink transmission via the second set of resources that have been reserved for the apparatus for uplink transmission.

6. The apparatus of claim 1, wherein the apparatus comprises a first user device, wherein the priority downlink data transmission is addressed to a second user device, the computer instructions further causing the apparatus to perform the following:
receive, from the base station, downlink control information associated with the priority downlink data transmission from the base station to the second user device that preempts an ongoing downlink data transmission from the base station to a third user device;
determine, based on the downlink control information, a second set of contention-based resources for the priority uplink transmission, wherein the second set of resources were previously indicated by the base station as allocated for downlink transmission; and
send an uplink transmission via the second set of contention-based resources.

7. The apparatus of claim 1:
wherein causing the apparatus to receive comprises causing the apparatus to receive, from a base station in a wireless network, a downlink control information associated with an allocation of a first set of resources for a high priority downlink data transmission from the base station that preempts a scheduled low priority downlink data transmission from the base station;
wherein causing the apparatus to determine comprises causing the apparatus to determine, based on the downlink control information, a second set of resources allocated for a high priority uplink transmission, wherein the second set of resources allocated for a high priority uplink transmission were previously indicated by the base station as allocated for downlink transmission; and
wherein causing the apparatus to send further comprises causing the apparatus to send an uplink transmission via the second set of resources allocated for high priority uplink transmission.

8. The apparatus of claim 1 wherein the downlink control information indicates a first set of resources allocated for a priority downlink data transmission that preempts an ongoing downlink data transmission.

9. The apparatus of claim 1 wherein causing the apparatus to determine comprises causing the apparatus to:
determine, based on the downlink control information, a second set of resources for the priority uplink transmission, wherein the second set of resources were previously indicated by the base station as allocated for a downlink transmission.

10. The apparatus of claim 1 wherein causing the apparatus to determine, based on the downlink control information, a second set of resources allocated for the priority uplink transmission comprises causing the apparatus to:
determine a resource offset or a symbol offset between a first set of resources allocated for the priority downlink data transmission and the second set of resources allocated for the priority uplink transmission.

11. The apparatus of claim 1 wherein the downlink control information indicates a first set of resources or a size of a first set of resources allocated for the priority downlink data transmission that preempts the ongoing downlink data transmission; and wherein causing the apparatus to determine comprises causing the apparatus to determine, based on the first set of resources or the size of the first set of resources allocated for the priority downlink data transmission that preempts the ongoing downlink data transmission, a second set of resources allocated for the priority uplink transmission.

12. An apparatus comprising at least one processor and at least one memory including computer instructions that, when executed by the at least one processor, cause the apparatus to:

preempt, in a wireless network, an ongoing data transmission associated with a second user device with a priority downlink transmission to a first user device based on a reallocation of a first set of resources for the priority downlink transmission to the first user device;

allocate, based on the preempting, a second set of resources for a priority uplink transmission, wherein the second set of resources were previously indicated by the apparatus as allocated for other use; and receive, from the first user device, an uplink transmission via the set of resources allocated for priority uplink transmission, wherein the uplink transmission comprises a hybrid automatic repeat request (HARQ) feedback, including at least one of a HARQ Acknowledgement (HARQ ACK) or a HARQ negative acknowledgement (HARQ NACK).

13. A method comprising:

receiving, by a user device from a base station in a wireless network, a downlink control information associated with a priority downlink data transmission from the base station that preempts an ongoing data transmission;

determining, by the user device based on the downlink control information, a set of resources allocated for a priority uplink transmission, wherein the set of resources allocated for the priority uplink transmission were previously indicated by the base station as allocated for other use; and sending, by the user device, an uplink transmission via the set of resources allocated for the priority uplink transmission, wherein the sending, by the user device, the uplink transmission via the set of resources allocated for priority uplink transmission comprises sending a hybrid automatic repeat request (HARQ) feedback, including at least one of a HARQ Acknowledgement (HARQ ACK) or a HARQ negative acknowledgement (HARQ NACK).

14. The method of claim 13 wherein the determining, by the user device based on the downlink control information, the set of resources allocated for the priority uplink transmission comprises:

determining a resource offset or a symbol offset that identifies the set of resources allocated for the priority uplink transmission.

15. The method of claim 13 and further comprising:

receiving, by the user device via resources indicated by the downlink control information, the priority downlink data transmission from the base station that preempts the ongoing downlink data transmission from the base station.

16. The method of claim 13 wherein the sending, by the user device, an uplink transmission via the set of resources allocated for priority uplink transmission further comprises the user device sending at least one of the following to the base station:

a scheduling request (SR);
a channel state information (CSI) that includes one or more of a channel quality indicator (CQI), a precoding matrix indicator (PMI) and a rank indication (RI);
a buffer status report (BSR) for the user device;
a random access request;
user plane data; or
control plane data.

17. The method of claim 13 wherein the priority downlink data transmission is addressed to the user device, the user device performing the following:

receiving, by the user device via a first set of resources indicated by the downlink control information provided via dedicated signaling that is directed to the user device, the priority downlink data transmission from the base station that preempts an ongoing downlink data transmission from the base station;

determining, by the user device based on the downlink control information, a second set of resources that have been reserved for the user device to send a priority uplink transmission, wherein the second set of resources were previously indicated by the base station as allocated for downlink transmission; and wherein the sending comprises sending, by the user device, an uplink transmission via the second set of resources that have been reserved for the user device for uplink transmission.

18. The method of claim 13, wherein the user device comprises a first user device, wherein the priority downlink data transmission is addressed to a second user device, the method comprising the first user device performing the following:

receiving, by the first user device from the base station, downlink control information associated with the priority downlink data transmission from the base station to the second user device that preempts an ongoing downlink data transmission from the base station to a third user device;

determining, by the first user device based on the downlink control information, a second set of contention-based resources for the priority uplink transmission, wherein the second set of resources were previously indicated by the base station as allocated for downlink transmission; and sending, by the first user device, an uplink transmission via the second set of contention-based resources.

* * * * *